Oct. 12, 1965    A. FEY ET AL    3,211,405

SUPPORT FOR PHOTOGRAPHIC INSTRUMENTS AND THE LIKE

Filed Jan. 30, 1964    2 Sheets-Sheet 1

ALFRED FEY,
HELMUT HABERBOSCH,
RUDOLF THOMAS, INVENTORS.

BY Mestern, Ross & Mestern

Oct. 12, 1965   A. FEY ET AL   3,211,405
SUPPORT FOR PHOTOGRAPHIC INSTRUMENTS AND THE LIKE
Filed Jan. 30, 1964   2 Sheets-Sheet 2

ALFRED FEY,
HELMUT HABERBOSCH,
RUDOLF THOMAS, INVENTORS.

BY Mestern, Ross & Mestern

United States Patent Office 3,211,405
Patented Oct. 12, 1965

3,211,405
SUPPORT FOR PHOTOGRAPHIC INSTRUMENTS
AND THE LIKE
Alfred Fey, Imhofstrasse 14, Lauingen (Danube), Germany, and Helmut Haberbosch, Lauingen (Danube), Germany, and Rudolf Thomas Wels, Oberosterreich, Austria; said Haberbosch and said Thomas assignors to said Fey
Filed Jan. 30, 1964, Ser. No. 341,321
16 Claims. (Cl. 248—183)

Our present invention relates to a support, such as a tripod, for photographic and similar instruments required to be placed in different azimuthal positions and/or tilted at various angles with reference to the vertical.

The object of this invention is to provide, in such tripod, a compact mount in the form of a leg-supported body to which a platform adapted to carry a photographic camera or other instrument is movably secured, the platform being tiltable about a horizontal axis and/or rotatable about a vertical axis into a selected position in which it can be immobilized by quick-acting and dependable locking means.

Another object of our invention is the provision of simple means for ascertaining whether or not the tiltable platform is in a predetermined position relative to its supporting body, and whether both are properly oriented with reference to their surroundings, e.g., whether their common axis is perpendicular to the horizon.

A further object is to provide a mount of this description whose external appearance is such as to create the esthetic impression of a compact unitary structure in spite of the relative displaceability of the parts which will be apparent only upon closer inspection.

The foregoing objects are realized, in accordance with a feature of our instant invention, by the provision of a generally cylindrical mount with a vertical axis and a convex top surface normally overlain by the instrument-carrying platform, the latter being swingably secured to a stem projecting from an upwardly and laterally open channel of the mount within which it is tiltable from a vertical position into a substantially horizontal position. The stem is rigid with a ball swivelably socketed in the mount body, the distance of the center of this ball from any part of the convex surface exceeding the radius of the body transverse to its axis so that the platform can be freely swung into a substantially vertical position alongside the cylinder. In order to lock the ball in any selected position within its socket, we prefer to provide the cylindrical body with a bottom recess in which a piston is slidable, under pressure of a manually operable cam, into clamping engagement with the ball.

Another feature of this invention concerns the rotatable mounting of the cylindrical body on a base in which the legs of the tripod are adjustably anchored, means being again provided for fixing the body in any angular position relative to the base. Such fixing may be accomplished by a screw radially threaded into a flange of the mount body for engagement with an inwardly displaceable but nonrotatable element, such as a split ring, frictionally bearing upon a boss of the base embraced by the flange; another possibility, designed to afford a faster locking and releasing action, utilizies an internally and an externally threaded member of preferably steep pitch angle matingly engaging each other, one of these members (preferably the internally threaded or female one) being non-rotatably coupled with the base and bearing upon an internal shoulder of the cylindrical body whereas the other member is axially restrained by a central element rigid with the base and is manually rotatable to urge the first-mentioned member into firm contact with the aforesaid shoulder. The central element restraining the rotatably threaded member is advantageously a clamping bolt interconnecting an upper and a lower plate together constituting the base, the legs of the tripod having swivelable heads lodged in complementary concavities of the two plates so as to be frictionally retained in different positions of adjustment. It will be desirable to form the lower plate with generally radial solts and to provide bottom grooves aligned with these slots in the upper plate, the grooves receiving the legs of the tripod in nearly horizontal positions thereof whereby these legs may be individually inclined at different angles to the vertical ranging from 0° to almost 90°.

The cylindrical configuration of the mount body lends itself to an easy determination of the tilt of the platform if the latter is also given an external cylindrical shape, of the same radius as the body, and if both the body and the platform are provided along certain generatrices with linear markings, such as longitudinal grooves, indicating by their alignment a true perpendicular position of the platform with reference to the cylinder axis of the body. The same external configuration may also be given to the base, it being then possible to provide both the base and the body with peripheral markings which are alignable in a predetermined relative angular position thereof to indicate any azimuthal displacement of the body from that position. The upright positioning of the cylinder axis may be readily established by aligning the peripheral lines of the mount with building lines or other vertical objects and adjusting the tripod legs, if necessary, to establish coincidence.

The above and other features of our invention will become more fully apparent from the following detailed description, reference being made to the accompanying drawing in which.

Figure 1:
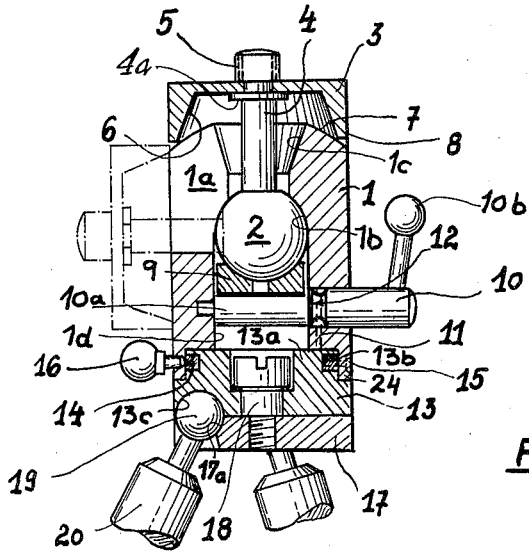
FIG. 1 shows, in sectional elevation, the leg-supported part of a tripod embodying the invention including a mount body, a base and a platform.
Figure 2:
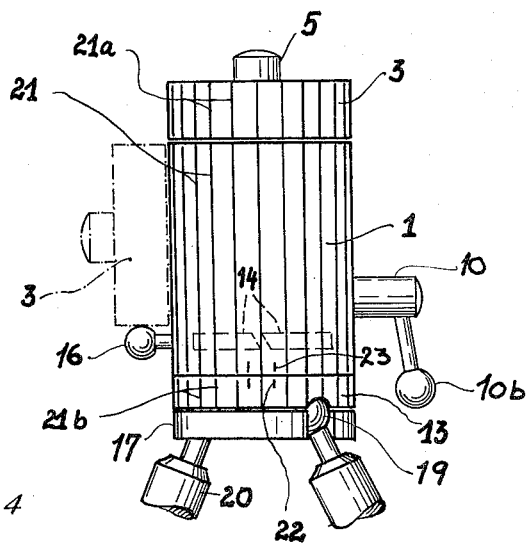
FIG. 2 is a side view of the elements shown in FIG. 1 in an alternate position of a handle forming part of the locking mechanism for the platform.

The tripod shown in FIGS. 1 and 2 comprises a mount with a cylindrical body 1 and a base 13, 17 supported by three legs 20 (only two shown); an instrument-supporting platform 3 is swivelably carried on body 1, which is generally tubular and has its hollow interior widened into a downwardly concave socket 1b matingly receiving a ball 2 rigid with an upright stem 4. The free end of stem 4 is threaded and bears a screw cap 5 by which the platform 3 is forced against a shoulder 4a on the stem. The vertical bore of body 1 is frustoconically flared at 1c to enable a limited tilting of the stem 4 in all directions from its illustrated vertical position, the apex of the frustocone coinciding with the center of curvature of socket 1b and ball 2. A channel 1a, formed in body 1, is open toward the top and one side thereof and communicates with the frustoconical mouth 1c, this channel having a width slightly larger than that of stem 4 so that the latter can also be tilted into a horizontal position in which the platform 3 lies vertically alongside the body 1 as illustrated in dot-dash lines in FIGS. 1 and 2. This platform has a frustoconically recessed underside 6 with an annular rim 8 lying on the convex upper surface 7 of body 1 whose curvature is spherical and concentric with that of socket 1b; though the sphericity of surface 7 is not absolutely essential, it is necessary that the distance of any part thereof from the center of ball 2 be greater than the cylinder radius of body 1 in order to permit unimpeded swing of platform 3 into its dot-dash position. It will be apparent that, given the spherical curvature described, the convex surface 7 will at least partly support, with frictional contact, the rim 8 of platform 3 in virtually every position thereof except the one shown in dot-dash lines in which, however, the stem 4 will come to rest on the suitably trough-shaped bottom of channel 1a.

Figure 1A:
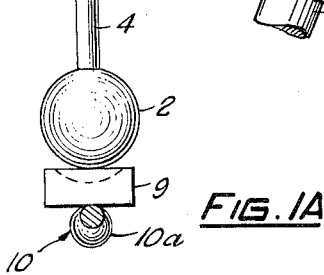
FIG. 1A is a detail view of the locking means of FIG. 1.

A disk-shaped piston 9 with a spherically concave upper face, conforming to the surface of ball 2, is slidable in the enlarged lower bore portion 1d of cylinder 1 which constitutes a recess open toward the base 13, 17. It will be understood that, by virtue of the aforedescribed spherical convexity of surface 7, the platform 3 (and, thus, the camera or other instrument supported thereon) will be frictionally held in almost any selected position of adjustment into which it can be shifted when the piston 9 is not in locking engagement with ball 2, such locking engagement being brought about by partial rotation of a cam shaft 10 which extends radially outwardly from cylinder 1 and has an eccentric extension 10a (FIG. 1A) adapted to bear upon the underside of the piston when a handle 10b is turned downwardly as illustrated in FIG. 2. A setscrew 11 in body 1 engages in an annular groove 12 of shaft 10 to hold it against displacement in radial direction of the cylinder.

The base rotatably supporting the cylindrical body 1 is composed of two cylindrical plates 13 and 17 having the same radius as the body 1 and the platform 3; thus, as best seen in FIG. 2, the entire unit 3, 1, 13, 17 has the outward appearance of a continuous cylinder when the platform 3 occupies its normal horizontal position. Body 1, platform 3 and at least the upper plate 13 of base 13, 17 are provided with external peripheral flutes 21, 21a, 21b which extend along respective generatrices thereof and constitute linear markings designed to be brought into coincidence with vertical lines on remote objects to indicate to the user the exact vertical positioning of the cylinder axis. If, furthermore, the vertical lines 21a on platform 3 merge continuously with the lines 21 on body 1, the two parts 1 and 3 are in exact axial alignment so that the platform 3 is precisely horizontal.

The ball-and-socket joint 1b, 2 enables the platform 3 to be not only tilted with reference to body 1 but also rotated about the axis of stem 4. The base 13, 17, having a cylindrical boss 13a received in an annular flange 24 of body 1, is similarly rotatable with respect to that body. Base plate 13 and mount body 1 have been shown additionally provided with external markings 22, 23 indicating by their alignment a predetermined reference position; similar markings, not shown, may of course be applied to the platform 3 and the adjacent edge of body 1. A predetermined relative angular position of the three elements 1, 3 and 17 may also be indicated by a non-uniform spacing of the flutes 21, 21a, 21b so that these flutes will register with one another only in that particular position.

In order to immobilize the body 1 with reference to the base 13, 17, its flange 24 is provided with a radially extending screw 16 adjoining a split ring 14 which is rotatably lodged in a peripheral groove 13b of plate 13 and is fastened at one point, or at several closely adjacent points, to flange 24 by one or more screws 15. The ring 14 thus securely holds the base plate 13 against axial displacement relative to body 1 while permitting relative rotation thereof until the screw 16 is manually tightened so that its tip presses a mobile portion of ring 14 into firm contact with boss 13a.

The two plates 13, 17 of the base are formed with complementary spherical concavities 13c, 17a which receive spherical heads 19 of three tripod legs 20. A shoulder bolt 18 is received in a central recess of upper plate 13 and threadedly engages the lower plate 17 so as to urge the two plates toward each other with sufficient force to permit the adjustment of legs 20 but with enough pressure to insure frictional retention of these legs at selected inclinations with reference to the vertical. The construction of this part of the tripod is identical with that of the embodiment shown in FIGS. 3 and 4 and will be described in greater detail with reference thereto.

Figure 3:
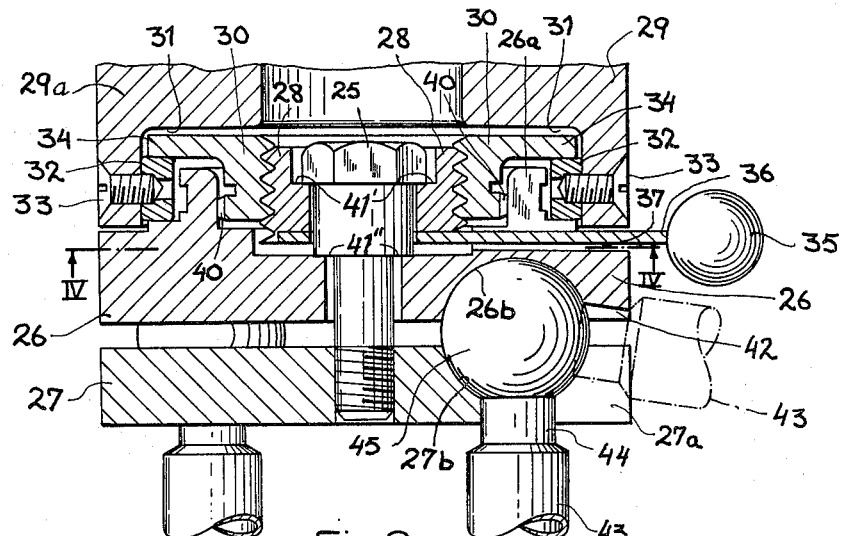
FIG. 3 is an enlarged fragmentary sectional view, similar to FIG. 1, of the base and the lower part of the main body of a mount constituting another embodiment.
Figure 4:
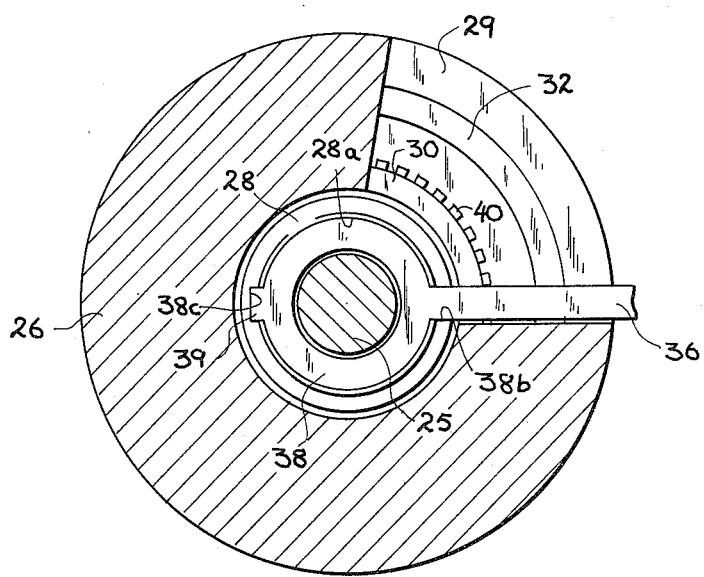
FIG. 4 is a fragmentary sectional view taken on the line IV—IV of FIG. 3.

In FIGS. 3 and 4 we have shown only the lower part of a cylindrical mount body 29 whose upper part may be considered identical with that of cylinder 1 in FIGS. 1 and 2. Body 29 has an annular flange 29a to which a ring 32, preferably of nonferrous metal such as brass is attached by screws 33. Thus there is defined, within the cylindrical recess formed by the flange 29a, an inner peripheral groove 31 rotatably receiving a flange 34 integral with an internally threaded member or nut 30. An externally threaded central member 28, in the form of a tubular bolt, engages the nut 30 above the upper base plate 26 and is axially restrained with reference to that plate by a shoulder 41' of the connecting bolt 25 which, while bearing with its second shoulder 41'' upon the plate 26, threadedly engages the lower base plate 27 in the aforedescribed manner to hold the tripod legs 43 in frictional engagement therewith.

Bolt 28 is held against rotation relatively to base 26, 27 by an upstanding collar 26a rigid with plate 26, the inner periphery of this collar being frictionally or positively engaged by surface ribs 40 on the outer periphery of nut 30 which for this purpose may be similarly fluted or corrugated, as shown. The plate 26 and its collar 26a are provided with a sectoral cutout 37 of sufficient length to enable the swing of a handle 36, traversing that cutout, for loosening or tightening the grip of nut 30 and plate 26 upon ring 32. Handle 36, terminating in a knob 35 outside cylindrical body 29, is positively connected with center bolt 28 by having an integral annular extension 38 lodged in a bottom groove 28a of that bolt, the bottom of bolt 28 being further cut away at 38b and 38c to accommodate the handle 36 proper and a diametrically opposite lug 39 on ring 38. The axial detachment of handle 36 from nut 28 may be prevented by a simple press fit although, of course, auxiliary fastening means such as screws (not shown) may also be used.

If the handle 36 is moved into one of its terminal positions with the aid of knob 35, bolt 28 is rotated relatively to nut 30 so that the latter is drawn closer to the plate 26 and clamps the ring 32 on flange 29a between its own flange 34 and the plate 26; this immobilizes the mount body 29 with reference to base 26, 27. The connection may be loosened by swinging of knob 35 and handle 36 into an alternate position at the opposite end of cutout 37. In order to limit the size of the cutout, the mating threads of members 28 and 30 are preferably of large pitch angle.

The heads 45 of the tripod legs 43 are connected to these legs by way of reduced neck portions 44 which come to rest in respective radial grooves 42 of the upper base plate 26 when the legs 43 are swung outwardly into a nearly horizontal position as shown in dot-dash lines in FIG. 3. The grooves 42, merging with the substantially hemispherical concavities 26b in top plate 26, are aligned with slots 27a in bottom plate 27 which merge with the complementary concavities 27b thereof. Slots 27a are, of course, wide enough to permit the legs 43 to be raised into their spread-out positions in which their necks 44 abut the channels 42 so as to be positively locked against further displacement.

The mount body 29 and the base plates 26, 27 may, of course, be externally fluted or otherwise marked in the same manner as has been described for the corresponding elements 1, 13 and 17 in FIGS. 1 and 2.

The structure specifically described and illustrated may be modified in various ways without departing from the spirit and scope of our invention as defined in the appended claims.

We claim:

1. A support for photographic instruments and the like, comprising a leg-supported hollow body with a convex top surface and a vertical bore terminating thereat, said bore widening below said surface into a socket of spherical curvature centered on a point whose distance from any part of said surface exceeds the width of said body at the level of said point; a ball matingly received in said socket, said ball being provided with a stem projecting outwardly through said bore beyond said surface, said body in a vertical plane through said point being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of side body, said platform having a downwardly concave underside hugging said convex surface in its horizontal portion; and locking means on said body for releasably clamping said ball in said socket, thereby immobilizing said platform in any selected position thereof.

2. A support as defined in claim 1 wherein said bore has a conically flared upper end converging toward said point whereby said platform is limitedly tiltable in all directions.

3. A support for photographic instruments and the like, comprising a generally cylindrical leg-supported hollow body with a vertical axis, said body having a convex top surface and a vertical bore terminating thereat, said bore widening below said surface into a socket of spherical curvature centered on a point on said axis whose distance from any part of said surface exceeds the radius of said body transverse to said axis at the level of said point; a ball matingly received in said socket, said ball being provided with a stem projecting outwardly through said bore beyond said surface, said body in a vertical axial plane being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of said body, said platform having a downwardly concave underside hugging said convex surface in its horizontal position; and locking means on said body for releasably clamping said ball in said socket, thereby immobilizing said platform in any selected position thereof, said platform having a cylindrical periphery of the same radius as said body and being coaxially alignable therewith, said body and said platform being provided with external vertical markings indicating by their alignment the coaxial position thereof.

4. A support as defined in claim 3 wherein said convex surface is spherically curved about said point, said platform having a frustoconically recessed underside facing said spherically curved surface and contacting it in its horizontal position.

5. A tripod for photographic instruments and the like, comprising a hollow body with a convex top surface and a vertical bore terminating thereat, said bore widening below said surface into a socket of spherical curvature centered on a point whose distance from any part of said surface exceeds the width of said body at the level of said point; a ball matingly received in said socket, said ball being provided with a steam projecting outwardly through said bore beyond said surface, said body in a vertical plane through said point being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of said body, said platform having a downwardly concave underside hugging said convex surface in its horizontal position; locking means on said body for releasably clamping said ball in said socket, thereby immobilizing said platform in any selected position thereof; a base in contact with the lower end of said body for rotatably supporting same; detent means for arresting said body in a selected angular position relative to said base; and three legs adjustably anchored in said base, said body being provided with a bottom recess open toward said base, said locking means including an upwardly concave piston slidable in said recess and manually operable cam means below said piston for urging same into mating engagement with said ball.

6. A tripod for photographic instruments and the like, comprising a cylindrical hollow body with a vertical axis, said body having a convex top surface and a vertical bore terminating thereat, said bore widening below said surface into a socket of spherical curvature centered on a point on said axis whose distance from any part of said surface exceeds the radius of said body transverse to said axis at the level of said point; a ball matingly received in said socket, said ball being provided with a stem projecting outwardly through said bore beyond said surface, said body in a vertical axial plane being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of said body, said platform having a downwardly concave underside hugging said convex surface in its horizontal position; locking means on said body for releasably clamping said ball in said socket, thereby immobilizing said platform in any selected position thereof; a cylindrical base coaxial and flush with said body in contact with the lower end thereof for rotatably supporting same; detent means for arresting said body in a selected angular position relative to said base; and three legs adjustably anchored in said base, said body having a depending annular flange surrounding a raised boss of said base, said boss being provided with a peripheral groove accommodating a split ring attached to said flange, said detent means including a screw on said flange manipulable to exert clamping pressure upon a mobile portion of said ring for frictional engagement thereof with said boss.

7. A tripod for photographic instruments and the like, comprising a hollow body with a convex top surface and a vertical bore terminating thereat, said bore widening below said surface into a socket of spherical curvature centered on a point whose distance from any part of said surface exceeds the width of said body at the level of said point; a ball matingly received on said socket, said ball being provided with a stem projecting outwardly through said bore beyond said surface, said body in a vertical plane through said point being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of said body, said platform having a downwardly concave underside hugging said convex surface in its horizontal position; locking means on said body for releasably clamping said ball in said socket, thereby immobilizing said platform in any selected position thereof; a base in contact with the lower end of said body for rotatably supporting same, said body being provided on its underside with a substantially cylindrical recess and with an annular shoulder in said recess defining a peripheral groove therein; an internally threaded member rotatably received in said groove; an externally threaded member matingly engaging said internally threaded member; retaining means on said base securing said externally threaded member at least against major axial displacement relative thereto; coupling means on said base engaging one of said members for preventing rotation thereof relative to said base; handle means on the other of said members projecting laterally outwardly beyond said base for enabling relative rotation of said members whereby said body can be released for rotation relative to said base and subsequently locked in a selected angular position; and three legs adjustably anchored to said base.

8. A tripod as defined in claim 7 wherein said base comprises an upper and a lower plate formed with complementary concavities of spherical curvature, said legs having spherical heads partly received in the concavities of both said plates, said lower plate having generally radial slots communicating with the concavities thereof for enabling a sideways swinging of the corresponding legs, said base further having clamping means urging said plates toward each other for frictionally holding said heads in selected leg positions.

9. A tripod as defined in claim 8 wherein said upper plate has bottom grooves aligned with said slots for receiving said legs in nearly horizontal downwardly inclined positions thereof.

10. A tripod for photographic instruments and the like, comprising a cylindrical hollow body with a vertical axis, said body having a convex top surface and a vertical bore terminating thereat, said bore widening below said surface into a socket of spherical curvature centered on a point on said axis whose distance from any part of said surface exceeds the radius of said body transverse to said axis at the level of said point; a ball matingly received in said socket, said ball being provided with a stem projecting outwardly through said bore beyond said surface, said body in a vertical axial plane being formed with an upwardly and laterally open channel merging into said bore and extending from it across said surface and an adjoining side of said body over an arc of substantially 90°, said channel being wide enough to accommodate said stem whereby the latter is tiltable from a vertical position into a substantially horizontal position in which it projects laterally from said body; an instrument-supporting platform secured to the projecting tip of said stem for swinging between a horizontal position atop said surface and a substantially vertical position at said side of said body, said platform having a downwardly concave underside hugging said convex surface in its horizontal position; locking means on said body for releasably clamping said ball in said socket, thereby immobilizing said platform in any selected position thereof; a cylindrical base coaxial and flush with said body in contact with the lower end thereof for rotatably supporting same, said body being provided on its underside with a substantially cylindrical recess and with an annular shoulder in said recess defining a peripheral groove therein; an internally threaded member rotatably received in said groove; an externally threaded central member matingly engaging said internally threaded member; retaining means on said base securing said central member at least against major axial displacement relative thereto; coupling means on said base engaging one of said members for preventing rotation thereof relative to said base; handle means on the other of said members projecting laterally outwardly beyond said base for enabling relative rotation of said members whereby said body can be released for rotation relative to said base and subsequently locked in a selected angular position; and three legs adjustably anchored to said base.

11. A tripod as defined in claim 10 wherein said body and said base are provided with peripheral markings alignable in a predetermined relative angular position thereof.

12. A tripod for photographic instruments and the like comprising a hollow body; an instrument-supporting platform tiltably secured to an upper end of said body; a base in contact with the lower end of said body for rotatably supporting same, said body being provided on its underside with a substantially cylindrical recess and with an annular shoulder in said recess defining a peripheral groove therein; an internally threaded member rotatably received in said groove; an externally threaded member matingly engaging said internally threaded member; retaining means on said base securing said externally threaded member at least against major axial displacement relative thereto; coupling means on said base engaging one of said members for preventing rotation thereof relative to said base; handle means on the other of said members projecting laterally outwardly beyond said base for enabling relative rotation of said members whereby said body can be released for rotation relative to said base and subsequently locked in a selected angular position; and three legs adjustably anchored to said base, said base comprises an upper and a lower plate formed with complementary concavities of spherical curvature, said legs having spherical heads partly received in the concavities of both said plates, said lower plate having generally radial slots communicating with the concavities thereof for enabling a sideways swinging of the corresponding legs, said base further having a clamping bolt urging said plates toward each other for frictionally holding said heads in selected leg positions, said retaining means including a stepped head on said bolt rotatably engaging said central member, said coupling means comprising an upstanding collar rigid with said upper plate, said internally threaded member being provided with a ribbed annular surface engaging said collar, said handle means being secured to said externally threaded member just above said upper plate for horizontal swinging movement.

13. A tripod as defined in claim 12 wherein said collar is provided with a horizontal sectoral cutout, said handle means comprising an arm passing outwardly through said cutout and a ring integral with said arm received with positive interlocking engagement in an annular bottom groove of said externally threaded member.

14. A tripod for photographic instruments and the like, comprising a cylindrical hollow body with a vertical axis; an instrument-supporting platform tiltably secured to an upper end of said body, said platform having a cylindrical periphery which is coaxial and flush with said body in a horizontal position atop said body; a cylindrical base coaxial and flush with said body in contact with the lower end thereof for rotatably supporting same, said body being provided on its underside with a substantially cylindrical recess and with an annular shoulder in said recess defining a peripheral groove therein; an internally threaded member rotatably received in said groove; an externally threaded central member matingly engaging said internally threaded member; retaining means on said base securing said central member at least against major axial displacement relative thereto; coupling means on said base engaging one of said members for preventing rotation thereof relative to said base; handle means on the other of said members projecting laterally outwardly beyond said base for enabling relative rotation of said members whereby said body can be released for rotation relative to said base and subsequently locked in a selected angular position; and three legs adjustably anchored to said base.

15. A tripod as defined in claim 14 wherein at least said platform and said body are externally provided with axially extending flutes alignable in said horizontal position of said platform.

16. A tripod as defined in claim 15 wherein said base is also provided with external flutes registering with those of said body in certain relative angular positions thereof.

References Cited by the Examiner

UNITED STATES PATENTS

| | | | |
|---|---|---|---|
| 1,309,375 | 7/19 | Taylor | 248—413 |
| 2,168,988 | 8/39 | Hultquist | 248—181 |
| 2,672,313 | 3/54 | Poole | 248—183 |
| 2,752,116 | 6/56 | Minnis | 248—181 |
| 2,919,093 | 12/59 | Mooney | 248—168 |
| 2,962,251 | 11/60 | Karpf | 248—183 |

FOREIGN PATENTS 583,028    10/58    Italy.

CLAUDE A. LE ROY, *Primary Examiner.*